US010588805B2

(12) United States Patent
Grow

(10) Patent No.: US 10,588,805 B2
(45) Date of Patent: Mar. 17, 2020

(54) LOW PROFILE ROLLING SUPPORT ASSEMBLY

(71) Applicant: Medcare Products, Inc., Burnsville, MN (US)

(72) Inventor: Matthew Grow, Albertville, MN (US)

(73) Assignee: Handicare USA, Inc., Maryland Heights, MO (US)

( * ) Notice: Subject to any disclaimer, the term of this patent is extended or adjusted under 35 U.S.C. 154(b) by 335 days.

(21) Appl. No.: 14/818,486

(22) Filed: Aug. 5, 2015

(65) Prior Publication Data
US 2015/0335509 A1   Nov. 26, 2015

Related U.S. Application Data

(63) Continuation of application No. 13/606,871, filed on Sep. 7, 2012, now Pat. No. 9,119,755.

(51) Int. Cl.
*A61G 7/10*     (2006.01)
*B66C 23/48*    (2006.01)

(52) U.S. Cl.
CPC ......... *A61G 7/1046* (2013.01); *A61G 7/1017* (2013.01); *B66C 23/48* (2013.01); *A61G 7/1051* (2013.01); *A61G 7/1061* (2013.01); *A61G 7/1098* (2013.01); *A61G 2200/52* (2013.01); *B62B 2203/11* (2013.01)

(58) Field of Classification Search
CPC .......................... A61G 7/1046; A61G 7/1017; A61G 2203/11; A61G 7/1051; A61G 7/1098; A61G 2200/52; A61G 7/1061; B66C 23/48; B62B 2203/11; Y10T 16/209; A47B 91/06; A47B 91/066

USPC ....... 5/81.1 R, 83.1, 86.1, 87.1; 16/18 R, 29, 16/30, 31 R
See application file for complete search history.

(56) References Cited

U.S. PATENT DOCUMENTS

| 831,838 | A | | 9/1906 | Diss |
| 2,186,724 | A | | 1/1940 | Harris |
| 2,225,753 | A | | 12/1940 | Milich |
| 2,358,007 | A | | 9/1944 | Henley |
| 3,047,904 | A | | 8/1962 | MacDouald |
| 3,071,389 | A | | 1/1963 | Bronislaus et al. |
| 3,137,869 | A | * | 6/1964 | Johnson ................. A61G 5/045 180/211 |
| 3,165,314 | A | * | 1/1965 | Clearman ................ A61H 3/04 135/67 |

(Continued)

OTHER PUBLICATIONS

Revvo—Casters and Wheels—The Revvo Caster Company, Inc., West Seneca, NY—Ft. Erie, OH-A Colson Associate Company.

*Primary Examiner* — Nicholas F Polito
*Assistant Examiner* — Amanda L Bailey
(74) *Attorney, Agent, or Firm* — Woodard Emhardt Henry Reeves & Wagner LLP

(57) ABSTRACT

Disclosed is a low profile rolling support assembly useful for supporting loads above a supporting surface where at least one end of the rolling support assembly is positionable beneath a structure having minimal clearance above the supporting surface. The rolling support assembly includes a load bearing member and a caster assembly containing a wheel where the load bearing member extends laterally away from the caster assembly at substantially the same height or less as the caster assembly.

11 Claims, 6 Drawing Sheets

(56) References Cited

U.S. PATENT DOCUMENTS

| | | | |
|---|---|---|---|
| 3,246,908 A * | 4/1966 | Marvin | B62D 7/02 |
| | | | 16/18 R |
| 3,441,974 A | 5/1969 | Dean | |
| 3,445,882 A | 5/1969 | Milano | |
| 3,537,721 A | 11/1970 | Warner, Jr. | |
| 3,724,022 A | 4/1973 | Alberti et al. | |
| 4,125,183 A | 11/1978 | Lang | |
| 4,700,430 A | 10/1987 | Raftery | |
| 5,097,565 A | 3/1992 | Shorey | |
| D336,022 S | 6/1993 | Archambault | |
| 5,412,838 A | 5/1995 | Yang | |
| 5,940,932 A | 8/1999 | LaHay | |
| 6,201,195 B1 * | 3/2001 | Carey | A61G 7/1017 |
| | | | 177/144 |
| 6,223,388 B1 * | 5/2001 | Sey | B60B 33/0002 |
| | | | 16/20 |
| 6,244,417 B1 | 6/2001 | Timmer et al. | |
| 6,550,100 B2 | 4/2003 | Drucker et al. | |
| 6,594,856 B1 | 7/2003 | Cherukuri | |
| 6,604,258 B2 | 8/2003 | Saggio et al. | |
| 6,854,159 B2 | 2/2005 | Ruitenbeek | |
| 7,441,786 B2 | 10/2008 | Stryker et al. | |
| 8,910,326 B2 * | 12/2014 | Wilson | A61G 7/10 |
| | | | 5/81.1 R |
| 2006/0045708 A1 | 3/2006 | Bain et al. | |
| 2009/0249544 A1 * | 10/2009 | Palay | A61G 5/14 |
| | | | 5/83.1 |

\* cited by examiner

LOW PROFILE ROLLING SUPPORT ASSEMBLY

CROSS-REFERENCE TO RELATED APPLICATIONS

This application is a continuation of application Ser. No. 13/606,871 filed Sep. 7, 2012, which is hereby incorporated by reference in its entirety.

BACKGROUND

In various situations it is sometimes desirable to lift or support a load above a surface using a free-standing support structure having lower lateral support members that can be positioned underneath low lying obstacles. For example, in a manufacturing setting, it might be desirable to use a lift to assist in maneuvering the component parts of a machine into position where the clearance under the machine is minimal. Likewise, medical imaging devices are often rolled into position suspended over a patient lying in a bed or on a table that may extend close to floor. Considering still other examples, it might be advantageous for certain drill presses, milling machines, radiant heat dryers for curing inks or dyes, large magnifying glasses, and some types of tables to be suspended above a structure with a very low clearance above the floor without interfering with it. In these situations, it might be preferable for the laterally extending support members to maintain a low profile to allow them to be positioned beneath other structures thereby allowing for better positioning of the load being supported above.

One example of where such a structure might be used in the healthcare field concerns patient lifts. It is often desirable to assist a patient to a standing or suspended position in cases where, for example, the patient is infirm or disabled and lacks the strength or coordination to stand without aid. It is common in such situations for a caregiver to assist a patient using a patient lift.

Two types of patient lifts are commonly used and examples of each are disclosed below. One type helps raise the patient from a sitting position to a generally standing position. The patient is supported by either holding onto support bars, or by wrapping a strap-type sling behind the patient's back and under the patient's arms. The sling or support bars are attached to a support arm which is raised and lowered by a lifting mechanism. In this way, a caregiver can assist in supporting the patient as the patient moves from a seated position to a generally erect position.

The second type of patient lift requires the patient to be placed in a sling or stretcher on a bed or chair. The sling or stretcher is then connected to a support arm which is raised and lowered by a lifting mechanism actuated by the caregiver. With this type of lift, the patient is completely supported from an overhead position, and has no active role in supporting themselves or assisting in being raised. Such a lift can temporarily raise a patient or transport them with minimal discomfort.

With both types of patient lifts, as with other examples cited above, it is often the case that the lift or stand has corresponding laterally extending support members at the lower extremity of the lift which support the lift structure and the load. It is often preferable that during use of a patient lift or similarly supported device that the lower supporting members extend laterally beneath whatever structure the load (in this case a patient) is resting on (like a hospital bed or chair). Because some of the structures the load is resting on extend close to the floor, it is often the case that those structures interfere with the positioning of the laterally extending support members on the lift or stand.

SUMMARY

A low profile rolling support assembly is disclosed. The rolling support assembly includes a low profile caster assembly configured to support a load bearing member extending laterally away from the side of the caster assembly. One embodiment of the caster assembly includes a rotating wheel that is pivotally mounted to a hub configured to transfer weight resting on the load bearing member to the floor through the wheel. Both the caster assembly and the load bearing member extend above the floor about the same height as the wheel thus reducing the chance of interference between the rolling support assembly and lower members of a structure with a low clearance height underneath, for example a hospital bed, table, or chair the patient may be resting on.

Further, additional embodiments will be apparent to those skilled in the art from the Detailed Description herein.

DETAILED DESCRIPTION

Figure 1:
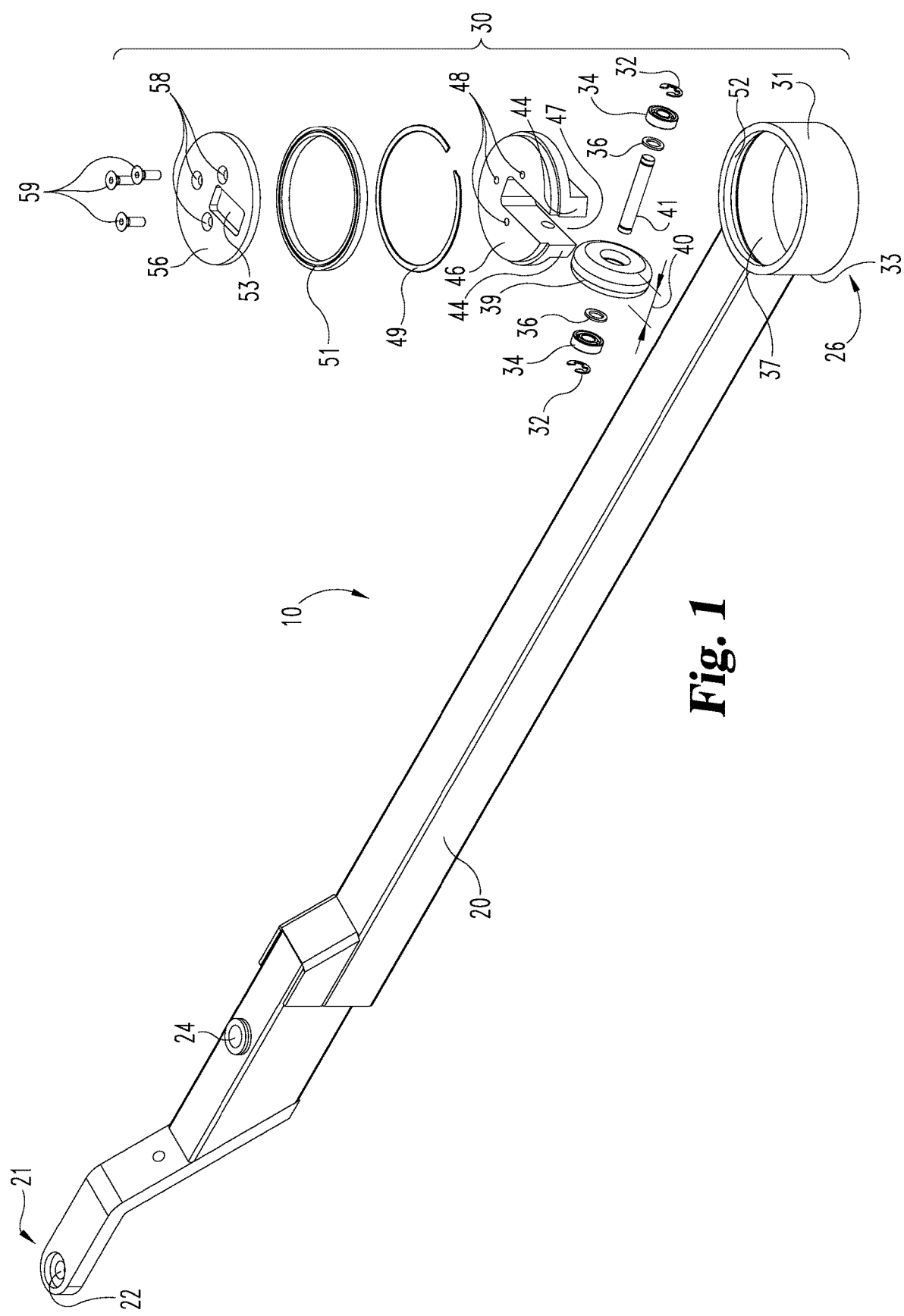
FIG. 1 is an exploded view of a preferred embodiment of a low profile rolling support assembly.

For the purpose of promoting an understanding of the principles of the invention, reference will now be made to certain embodiments, some of which are illustrated in the drawings, and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The uses of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Illustrated in FIG. 1 is a rolling support assembly 10 useful for supporting an article such as a patient lift or other load above a supporting surface in situations where clearance under a potential interfering structure may be minimal. A longitudinal load bearing member 20 is shown having a first end 21, a second end 26, a mount 24 and an attachment region 22. A caster assembly 30 is positioned at second end 26 such that load bearing member 20 approaches caster assembly 30 laterally from a side, and extends laterally away from the corresponding side. As will be described in greater detail below, forces applied vertically to load bearing member 20 are therefore transmitted substantially horizontally through load bearing member 20 to caster assembly 30 and attachment region 22.

Figure 2:
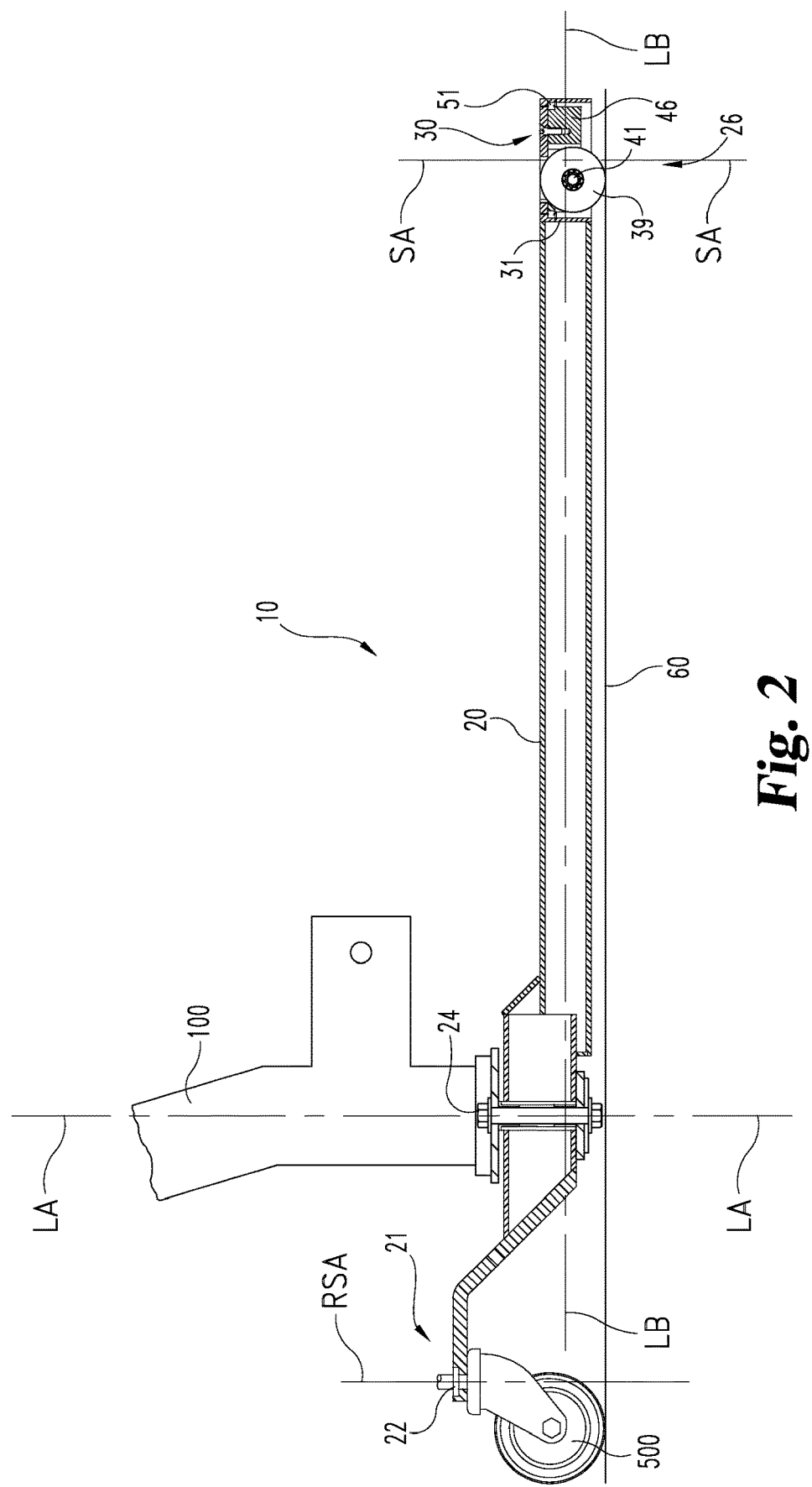
FIG. 2 is a cross-sectional side view of the rolling support assembly of FIG. 1.
Figure 3:
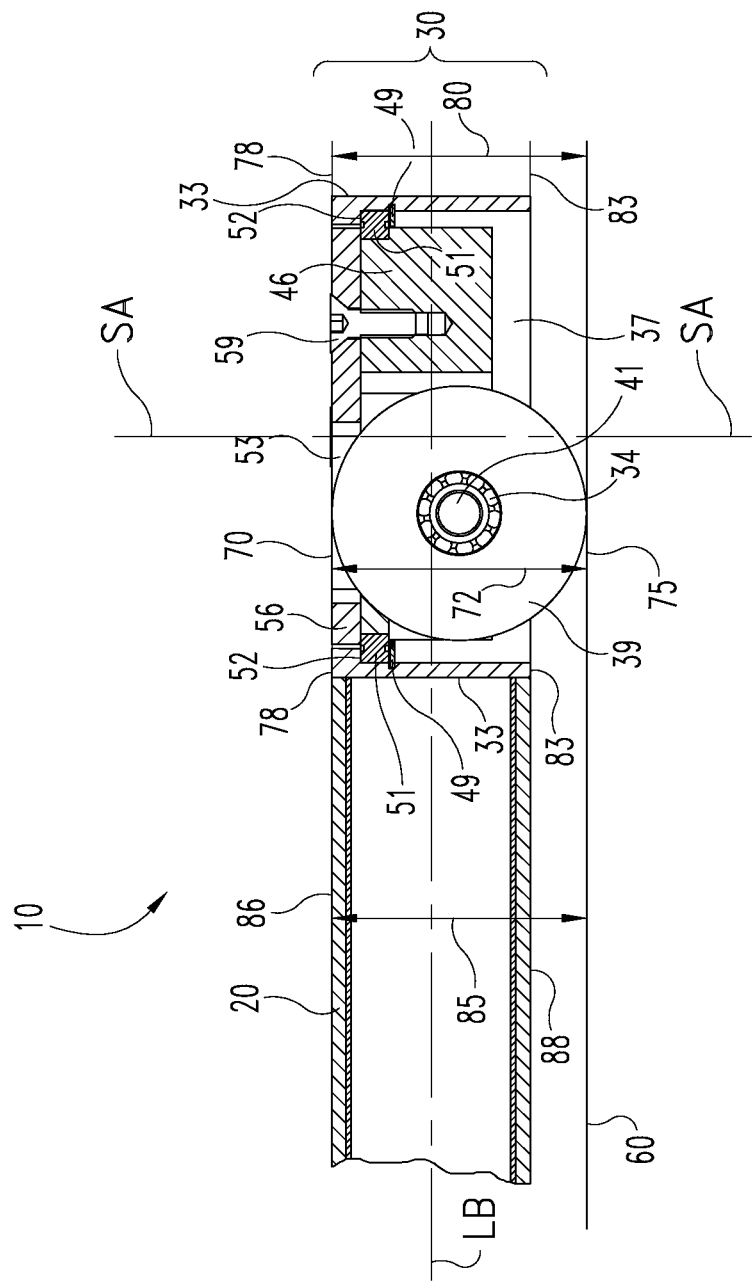
FIG. 3 is a magnified view of one end of the rolling support assembly of FIG. 2.

As shown in FIGS. 1 and 2, caster assembly 30 includes a frame 31, hub 46, and wheel 39. Frame 31 has a side wall 33 that provides structure and rigidity to caster assembly 30 and operates to transfer forces transmitted through load bearing member 20 to hub 46. Hub 46 is pivotally mounted or rotatably coupled within a central opening 37 defined by frame 31, shown in FIGS. 1 and 2 as a substantially circular opening. The mounting or coupling of hub 46 to frame 31 is achieved by a retaining member 52 and a bearing assembly 51 which together have a smaller inner diameter than the outer diameter of hub 46. Retaining member 52 is preferably a flange, ring, series of studs, pins, screws, or other projecting members as shown in FIG. 1-3. However, retaining member 52 can also be an inset, groove, or other similar structure wherein bearing assembly 51 is lodged or otherwise fixed to frame 31. Regardless of the embodiment used, this arrangement causes retaining member 52 to maintain hub 46 in place together with frame 31 in operation when both structures receive vertical pressure under the force of a load applied to load bearing member 20. Hub 46 also has a wheel mount 44 to which wheel 39 is pivotally mounted to rotate around an axle 41 coupled to wheel mount 44. As force is transmitted to hub 46 from frame 31, these forces are in turn transferred to axle 41 and to wheel 39.

Also shown in FIG. 1 are specific details indicating how wheel 39 is pivotally mounted to axle 41. Wheel 39 has a width 40 and rotates around an axis of rotation defined by axle 41 which is supported by wheel mount 44. In the embodiment of hub 46 shown in FIGS. 1-5, hub 46 has a wheel opening 47 into which wheel 39 is inserted. Wheel mount 44 coincides with wheel opening 47 such that wheel 39 freely rotates within wheel opening 47. As shown in FIG. 1, wheel 39 is supported on axle 41 by wheel bearing assemblies 34 which are arranged along axle 41 with washers 36 between them. Therefore when wheel 39 and axle 41 are finally positioned in hub 46, axle 41 passes through wheel mount 44, wheel bearing assemblies 34, and washers 36. Wheel 39 is positioned on the outside of wheel bearing assemblies 34 so that wheel bearing assemblies 34 are between wheel 39 and axle 41 thus providing rotatable support between axle 41 and wheel 39. With this arrangement, wheel 39 rotates around axle 41 while axle 41 is stationary within mount 44. Axle 41 is maintained in wheel mount 44 by axle retaining rings 32 which are positioned on opposing ends of axle 41, preferably in grooves, or notches, against positioning flanges, or by other similar retaining structures. In this manner axle 41 remains fixed in position with respect to hub 46.

Hub 46 optionally includes a cover 56 having an opening 53 and cover screw holes 58. Cover 56 is mounted to the top surface of hub 46 and fixed in place using screws 59 which are positioned through cover screw holes 58 into hub screw holes 48. In the embodiments shown, cover 56 is positioned so as not to interfere with the rotational movements of hub 46. Opening 53 allows the upper extent of wheel 39 to be positioned close to the top of caster assembly 30 without projecting beyond the top of caster assembly 30. Therefore, caster assembly 30 can be said to contain wheel 39 in that wheel 39 projects from the bottom of caster assembly 30 to contact a supporting surface, but does not project from the top so as to avoid interfering with an article, or object that rolling support assembly 10 may need to fit below. Other embodiments of cover 56 are envisioned, such as a cover positioned over frame 31 thus avoiding the need for an opening 53. However this is less advantageous because it adds height to caster assembly 30 beyond the height of frame 31 whereas the embodiment shown in FIG. 1 does not. Various other purposes for cover 56 are also envisioned which include, without limitation, reducing the risk of injuries caused by users who accidentally interfere with the moving parts within caster assembly 30, and/or reducing the size and quantity of foreign object debris entering caster assembly 30 from above.

Caster assembly 30 further includes a bearing assembly 51 for reducing the friction caused by the rotation of hub 46 relative to frame 31. Bearing assembly 51 is held in place between retaining member 52 and bearing retaining ring 49. Bearing retaining ring 49 is positioned on the opposite side of bearing assembly 51 from retaining member 52 to maintain bearing assembly 51 within central opening 37 when caster assembly 30 is disengaged from a supporting surface. When rolling support assembly 10 is in operation, retaining member 52 transfers vertical and horizontal forces applied to frame 31 to bearing assembly 51 so that force applied vertically to caster assembly 30 is transferred to hub 46. Bearing assembly 51 thus allows hub 46 to rotate within central opening 37 without generating excessive friction between hub 46 and frame 31. Bearing assembly 51 is preferably a ball bearing assembly and most preferably a four-point angular contact ball bearing assembly. A four-point angular contact ball bearing assembly is preferred because, as one of ordinary skill in the art will recognize, this type of bearing assembly maintains structural and operational integrity regardless of whether bearing assembly 51 is repeatedly subjected to forces applied in multiple dimensions simultaneously under load. For example, when caster assembly 30 is under load, bearing assembly 51 is subjected to both downward vertical forces and lateral horizontal forces such as when rolling support assembly 10 is moved.

FIG. 2 shows a cross-sectional view of rolling support assembly 10 shown in FIG. 1 with additional detail indicating some of the geometry of the forces acting on it. Load bearing member 20 is shown supported above a supporting surface 60 by caster assembly 30 at second end 26 and rear support assembly 500 mounted at attachment region 22 at first end 21. Load bearing member 20 defines a load bearing axis LB that in the embodiment shown in FIG. 2 is horizontal and substantially parallel to supporting surface 60. As shown in FIG. 2, and with reference to FIG. 1 as well, load bearing member 20 abuts side wall 33 (which is the side wall of caster assembly 30) and extends laterally away from the outer surface of side wall caster assembly 30.

With respect to FIGS. 1-5, "horizontal" and "vertical" are defined relative to supporting surface 60, where any angle with respect to supporting surface 60 that is less than 45 degrees can be considered substantially horizontal, and an angle with respect to supporting surface 60 that is greater than 45 degrees can be considered substantially vertical. Lower angles are preferred to minimize the rise of load bearing member 20 over its run, with an angle of zero or approaching zero for a substantial length of load bearing member 20 being most preferred.

Load bearing axis LB is a reference line along which the vertical components of forces acting on load bearing member 20 are transmitted through and along load bearing member 20 to caster assembly 30. In another aspect, load bearing axis LB indicates the horizontal offset of the vertical components of forces acting on load bearing member 20 relative to the point at which load bearing member 20 extends away from caster assembly 30. Load bearing axis LB is therefore positioned as shown above supporting surface 60 as a central axis centered between the top 86, or upper extent of, and the bottom 88, or lower extent of load bearing member 20. The top 86 and bottom 88 of load bearing member 20 are determined where load bearing member 20 extends away from lateral outer surface of side wall 33, which in the embodiments shown in FIG. 1-5, is the lateral outer surface of caster assembly 30 as well. Stated another way, the top 86 and bottom 88 of load bearing member 20 are determined where load bearing member 20 approaches the lateral outer surface of caster assembly 30. As shown in FIG. 2, load bearing axis LB is a reference line defined by load bearing member 20 but is not entirely contained by it, rather load bearing axis LB extends through some or all of load bearing member 20 and then extends beyond it in either direction as well.

Hub 46 positioned within central opening 37 as described above is rotatable around a vertical support axis SA shown in FIGS. 2 and 3. Support axis SA and rear supporting axis RSA are both laterally offset from a load axis LA by a portion of the horizontal span of load bearing member 20. Among other things, load axis LA intersects and is perpendicular to the load bearing axis LB and indicates the horizontal offset along load bearing axis LB of the force perpendicular to supporting surface 60 exerted by a load 100 on load bearing member 20. Considering the geometry, force exerted along load axis LA is transmitted along load bearing axis LB by load bearing member 20 where it is then transferred to supporting surface 60 along support axis SA and rear supporting axis RSA. Force transfer occurs when load axis LA, load bearing axis LB, rear supporting axis RSA, and support axis SA intersect, cross, or coincide in a manner similar to that shown in FIG. 2. Therefore, the axes shown in FIG. 2 are said to be "intersecting" or "crossing" if they intersect or cross over one another with reference to their vertical displacements relative to supporting surface 60, and their horizontal displacements relative to load bearing axis LB. It is therefore not necessary for axes LA, LB, RSA, or SA to actually intersect in three dimensional space although this interrelationship may be indicated, suggested, or implied in the figures shown.

It is also evident in FIG. 2 that axes RSA and SA do not necessarily indicate the horizontal displacement along load bearing axis LB of the physical points of contact between wheel 39, rear support assembly 500 and supporting surface 60. As discussed to some extent above, and as can be seen to a greater degree in FIG. 3, forces transferred along load bearing member 20 to caster assembly 30 are transferred first to frame 31, through retaining member 52 into bearing assembly 51, then through hub 46 to axle 41, through bearing assembly 34 into wheel 39, and finally through wheel 39 to supporting surface 60. Stated in reverse, wheel 39 is supported by supporting surface 60 and supports bearing assemblies 34 which support axle 41. Axle 41 supports hub 46 which is coupled to and supports bearing assembly 51. Bearing assembly 51 is supported by retaining member 52 of frame 31.

Support axis SA thus indicates the horizontal displacement along load bearing axis LB of the vertical force on caster assembly 30 caused by load 100, not the precise horizontal offset of the contact point between wheel 39 and support surface 60. The remainder of the forces directed against load bearing member 20 not supported by caster assembly 30 are transferred through load bearing member 20 to rear support assembly 500. As with support axis SA, rear supporting axis RSA indicates the horizontal displacement of the vertical force on rear support assembly 500, not the precise position of where rear support assembly 500 contacts supporting surface 60. Rear support assembly 500 is shown in FIG. 2 as a prior art wheel assembly but may be embodied in various ways including various types of rolling support structures, motorized units, mobile platforms and the like.

The position of mount 24 along load bearing member 20 determines the horizontal offset of load axis LA and the extent to which caster assembly 30 is able to support a load positioned above a low clearance structure. For example, in the embodiments shown in FIGS. 1-3, load axis LA is offset from support axis SA by a distance greater than half the length of load bearing member 20 because mount 24 is greater than half the length of load bearing member 20 away from second end 26. This arrangement is preferable in many instances because it allows most of load bearing member 20 to extend beneath a structure. Therefore, when a load is applied along load axis LA, such as during a lifting operation from a low clearance hospital table or bed, the load is supported by caster assembly 30 positioned approximately beneath the load under the bed or table. However, it may be preferable in some instances to move mount 24 further toward second end 26 where load axis LA is offset from support axis SA along load bearing member 20 by a lesser distance such as one third or one fourth the length of load bearing member 20. To achieve additional reach beneath a low clearance structure, or possibly for other reasons, it may be advantageous to align load axis LA along rear support axis RSA. On the other hand, it may be more preferable to align load axis LA in the center of load bearing member 20 depending on the circumstances. Mount 24 may be positioned almost anywhere along load bearing member 24 depending on the desired reach of load bearing member 20 and the desired offset of load axis LA relative to support axis SA.

Further detail of caster assembly 30 is indicated in FIG. 3 where an enlarged cutaway view of second end 26 of rolling support assembly 10 is shown. The top 86 and bottom 88 of load bearing member 20 are shown where the top 86 defines a height 85 above supporting surface 60 in the area where load bearing member 20 extends away from caster assembly 30. Height 85 can also be thought of as a general reference point indicating a relative height above supporting surface 60 against which other relative heights above supporting surface 60 can be compared. Likewise, references to the "top" 86 of load bearing member 20 can also be thought of as a reference point indicating a relative height above supporting surface 60.

Likewise, caster assembly 30 has a bottom 83 and a top 78, the top 78 of caster assembly 30 defines height 80. These dimensions are specific heights at a given location as well as reference points relative to supporting surface 60 as well.

Heights 85 and 80 can be compared by comparing their relative displacements above supporting surface 60. For example in the embodiment shown in FIGS. 1-3, the top 78 of caster assembly 30 is at the same height 80 as the top 86 of load bearing member 20. In measuring height 80, the highest extent of caster assembly 30 is considered.

Wheel 39 is similarly shown in FIG. 3 having an upper extent 70 and a lower extent 75, with the distance between them being the height 72 of wheel 39. Because wheel 39 is an example of a rolling member or rolling support device configured to rotate around an axis, here defined by axle 41, wheel 39 does not have fixed locations serving as a "top" or "bottom." Height 72, upper extent 70 and lower extent 75 are also to be treated both as specific dimensions at a given location as well as reference points relative to supporting surface 60. These dimensions can then also be compared to other similar dimensions, such as the top 86 of load bearing member 20 and the top 78 of caster assembly 30. By comparing their relative displacements above supporting surface 60 without respect to the precise three-dimensional positioning of wheel 39, the profile of caster assembly 30, load bearing member 20, and wheel 39 can be measured independently or relative to one another. This is useful because in the embodiment shown in FIG. 3, and in various embodiments of caster assembly 30, wheel 39 is not centered within central opening 37 causing the physical highest point on wheel 39 to change position in three dimensions relative to load bearing member 20 and caster assembly 30 as hub 46 rotates inside frame 31. Height 72 can also be viewed as the approximate diameter of wheel 39.

As discussed above with respect to cover 56, and opening 53, wheel 39 is contained within caster assembly 30 with upper extent 70 of wheel 39 preferably at or below the top 78 of caster assembly 30 while lower extent 75 of wheel 39 projects below bottom 83 of caster assembly 30 to contact supporting surface 60. In the embodiment shown in FIG. 3, top 86 of load bearing member 20 is also at, or below, the top 78 of caster assembly 30. This arrangement effectively gives wheel 39 and caster assembly 30 a low profile with respect to load bearing member 20. This arrangement allows rolling support assembly 10 to support an article or load while positioned beneath low-lying structures such as beds, crates, stands, tables, and other similar structures where the clearance above supporting surface 60 is minimal.

In the configuration shown, height 80 of caster assembly 30 allows rolling support assembly 10 to be positioned beneath a low clearance object. As shown in FIG. 3, changes to height 72 of wheel 39 effect the overall height 80 of caster assembly 30. As wheel height 72 increases, the overall height 80 of caster assembly 30 increases. In one preferred embodiment, height 72 of wheel 39 is 2.25 inches making the overall height 80 of caster assembly 30 about 2.25 inches. Height 80 may include other structures such as a low profile cover or supporting member that may be positioned above caster assembly 30 without making a substantial difference to height 80. For example, a cover of approximately 0.25 inches in thickness over the top of frame 31 may be used without substantially changing the overall height. Various other embodiments are also envisioned depending on the materials and design used to construct load bearing member 20 and caster assembly 30. A wheel 39 having a height as small as 1 inch is also envisioned. Wheels larger than 2.25 inches may be desirable depending on the situation. For example, some embodiments may prefer wheels of 3 inches, 5 inches, or greater than 5 inches without limitation, and may include solid molded wheels made of various plastics or other polymeric materials, natural or synthetic rubber, wheels formed from carbon fiber, solidified resins, metals, metallic compounds or metal alloys. Also envisioned our wheels 39 including tubeless rubber tires, pneumatic tires, or tires filled with various liquids or gases and the like.

As shown in the illustrated embodiments in FIGS. 1-3 and described above, bearing assembly 51 is maintained within caster assembly 30 by retaining member 52 which extends the entire distance around frame 31. However, other embodiments are envisioned as well for supporting structures within caster assembly 30 which are also able to maintain bearing assembly 51, and by extension, hub 46 in position. For example, in another embodiment, hub 46 is supported by a circular or semicircular frame at three points around central opening 37, for example with two of the three points of support 180 degrees apart with the third positioned along the frame preferably about halfway between them. The three points of support may be embodied as three individual ball bearing assemblies, a single ball bearing assembly having three contact points, three individual balls positioned between hub 46 and a frame, or any of various other suitable types of rotatable or pivotal mounting devices known to one of ordinary skill in the art. Ball bearing assembly 51, in another embodiment, is simply a ring of ball bearings wedged between hub 46 and frame 31 with notches, flanges, retaining rings, or the like maintaining the ball bearings in position with respect to both hub 46 and a frame.

Similarly, hub 46 is shown extending across central opening 37 substantially covering or enclosing central opening 37 except for wheel mount 44 which includes wheel opening 47 within which wheel 39 is positioned. Other embodiments of hub 46 are also envisioned providing the same force transferring behavior. For example, in another embodiment, hub 46 is ring shaped and pivotally mounted to frame 31 (for example, by interacting with bearing assembly 51) and includes a wheel mount 44 composed of a single mounting hole for axle 41. In this embodiment, hub 46 effectively transfers load forces from load bearing member 20 through frame 31 and wheel 39 to supporting surface 60 even though hub 46 does not completely cover central opening 37.

Figure 3A:
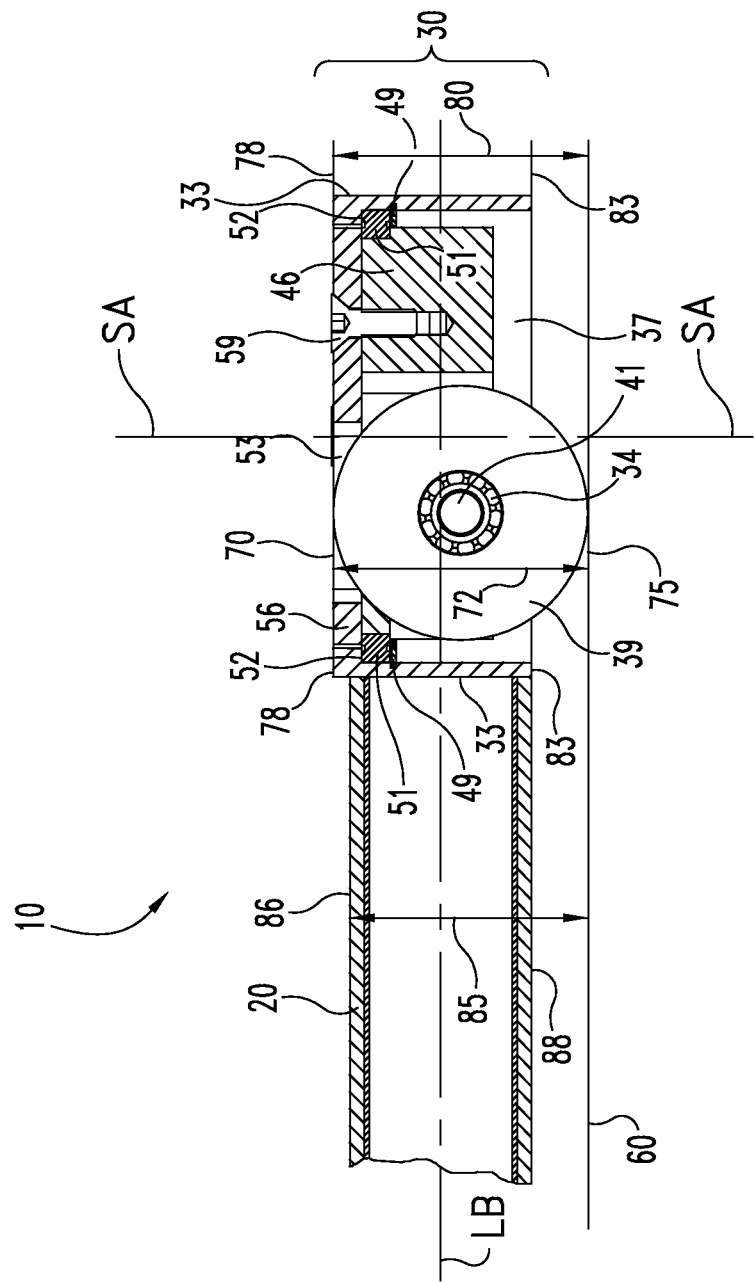
FIG. 3a is alternate embodiment of the rolling support assembly of FIG. 1.

Likewise, caster assembly 30 may support load bearing member 20 by any of various other configurations. For example, in certain embodiments, load bearing member 20 extends over or above caster assembly 30 while maintaining a height 85 that is minimally higher than caster assembly height 80 and wheel height 72, for example with a flat cover piece that rests on frame 31. In these embodiments, load bearing member 20 may extend over caster assembly 30 partially or completely covering it from above. Such an arrangement may be preferable in some instances, for example, for added strength or protection. In another example illustrated in FIG. 3a, the height 85 of load bearing member 20 as it laterally approaches caster assembly 30 is less than the height 72 of the caster assembly. As illustrated, height 85 is less than the height of wheel 39 at the point the load bearing member extends away from sidewall 33 of frame 31.

Other embodiments of load bearing member 20 may extend longitudinally beyond caster assembly 30 forward or sideways. It may also be advantageous in some situations to increase the width of load bearing member 20 so as to partially or completely surround caster assembly 30 with load bearing member 20. In such cases it may be preferable for increased stability to widen load bearing member 20 and to laterally displace caster assembly 30 along load bearing member 20 rather than terminating load bearing member 20 at caster assembly 30 as shown in FIGS. 1-3.

Various types of connections between load bearing member 20 and caster assembly 30 are envisioned as well. For example, caster assembly 30 may be a separate unit configured to be coupled to load bearing member 20 by screws, bolts, or other non-destructively removable fasteners. Likewise, caster assembly 30 may be attached by means of intermediate devices such as brackets, fittings, mountings, or other mechanical structures useful for aiding in the coupling of load bearing member 20 to caster assembly 30. One example of this type of configuration is a load bearing member 20 that does not attach directly to frame 31 but rather is attached to an intermediate bracket or cover which is then attached to the top surface of caster assembly 30 by coupling it to the top surface of frame 31. On the other hand, caster assembly 30 may be attached to load bearing member 20 by more permanent means such as welding, brazing, soldering, or other similar means. Similarly, load bearing member 20 may be formed such that frame 31 is an integral part of load bearing member 20 thus making caster assembly 30 an integral structure within load bearing member 20.

Figure 4:
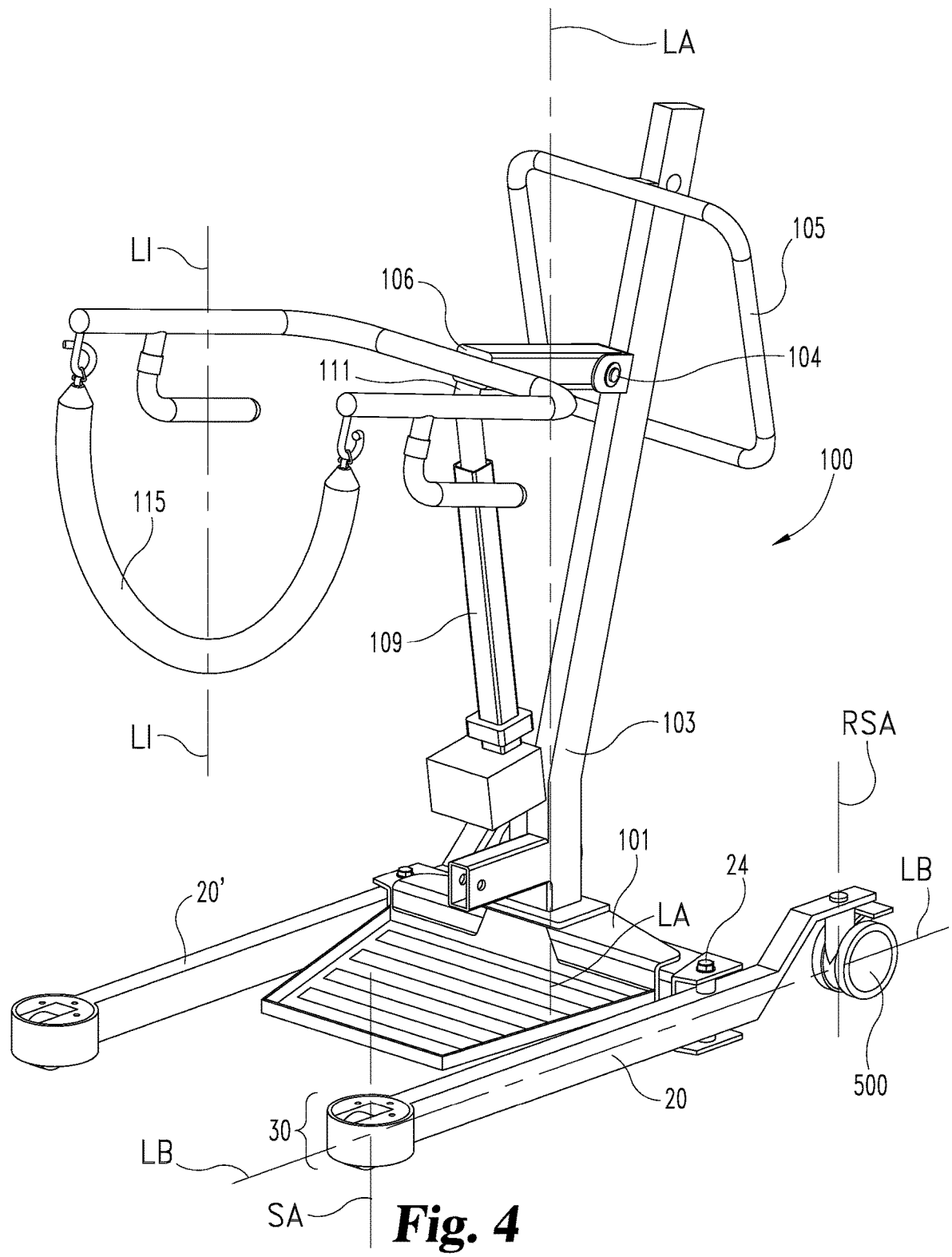
FIG. 4 is one embodiment of a prior art patient lift modified to include the low profile rolling support assembly of FIGS. 1-3.
Figure 5:
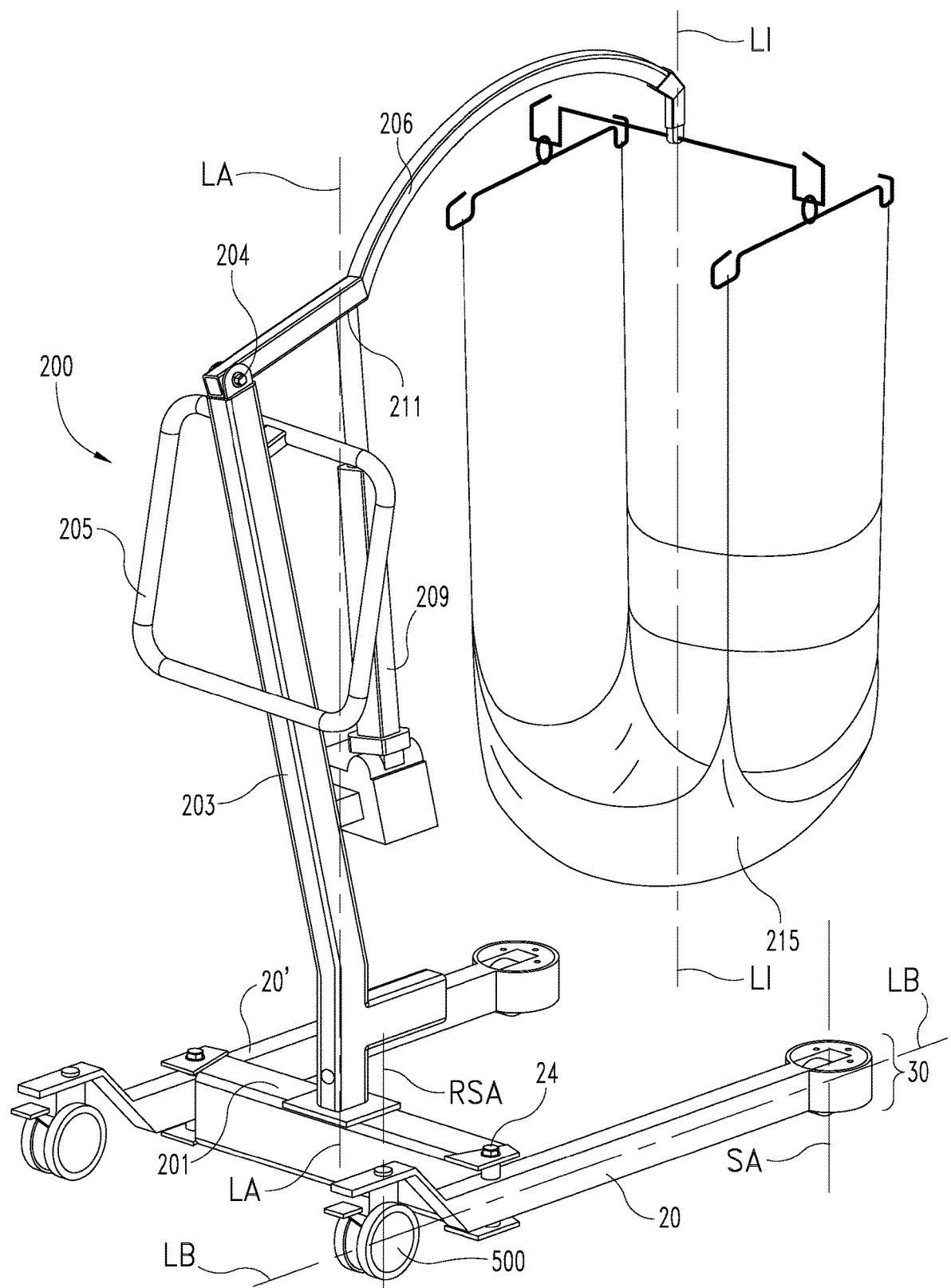
FIG. 5 is another embodiment of a prior art patient lift modified to include the low profile rolling support assembly of FIGS. 1-3.

In FIGS. 4 and 5 are illustrated two different embodiments of example patient lifts mounted on rolling support assemblies as embodied in FIGS. 1-3. Patient lift 100 may be used to assist a patient to a standing position. In FIG. 4, patient lift 100 (also schematically illustrated as load 100 in FIG. 2) is mounted to load bearing member 20 and mount 24 via a base 101. Patient lift 100 is supported by caster assembly 30 and rear support assembly 500 as shown and described in FIGS. 1-3. Support axis SA, load bearing axis LB and rear supporting axis RSA are also shown in accordance with the illustrations in FIGS. 1-3. A second rolling support assembly and load bearing member 20' is also shown and it should be assumed that all reference identifiers, axes, etc. are duplicated for both rolling support assemblies. In alternative embodiments with patient lifts or other loads, two or more load bearing assemblies to support devices or structures as disclosed herein may be used.

Patient lift 100 further includes a mast 103 extending vertically away from load bearing member 20 and base 101. A guidance or steering handle 105 useful for maneuvering patient lift 100 is also provided and is mounted to mast 103. A lifting device 109 is also coupled to mast 103 and is extendable to raise and lower support arm 106. Support arm 106 is coupled to mast 103 at a support arm pivot joint 104 and is also connected to lifting device 109 at a lifting device pivot joint 111. A patient load 115 extends from support arm 106, patient load 115 defining a lift axis LI laterally offset from load axis LA towards/over the forward support assemblies. In operation, lifting device 109 changes length causing support arm 106 to pivot on support arm pivot joint 104 thus raising support arm 106 with respect to supporting surface 60. As with support axis SA, load axis LA, and rear supporting axis RSA described in detail above, lift axis LI defines the horizontal position along the load bearing axis LB of the vertical component of the force created by patient load 115 that is perpendicular to supporting surface 60. Lift axis LI may be horizontally offset between load axis LA and support axis SA, or it may be offset closer or further from load axis LA than support axis SA (as viewed in two dimensions as shown in FIG. 2).

A second embodiment of an example patient lift 200 is illustrated in FIG. 5. Patient lift 200 has substantially the same components as appear in patient lift 100 except they are denoted with corresponding 200 numbers. As a difference, patient lift 200 may be used to fully support a patient or load. As with patient lift 100, mast 203 extends vertically away from load bearing member 20 and mount 201. A guidance or steering handle 205 useful for guiding patient lift 200 is also provided and is mounted to mast 203. A similar lifting device 209 is coupled to mast 203 and also operates to raise and lower support arm 206. Support arm 206 is coupled to mast 203 at a support arm pivot joint 204 and is also connected to lifting device 209 at a lifting device pivot joint 211. A patient load 215 extends from support arm 206, patient load 215 similarly defining a lift axis LI laterally offset from load axis LA. As with patient load 100, lifting device 209 raises support arm 206 with respect to supporting surface 60. As with patient lift 100, lift axis LI may be horizontally offset between load axis LA and support axis SA, or it may be offset closer or further from load axis LA than support axis SA (as viewed in two dimensions as shown in FIG. 2).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. In addition, all references cited herein are indicative of the level of skill in the art and are hereby incorporated by reference in their entirety.

What is claimed is:

1. A rolling support assembly for an article comprising:
a longitudinal load bearing member defining a load bearing member upper extent, a load bearing member lower extent, and a load bearing axis centered between the load bearing member upper and lower extents, wherein the load bearing member is oriented substantially parallel to a support surface, wherein the load bearing member upper extent defines a load bearing member height
a front caster assembly supporting a first end of the load bearing member and defining a height, wherein the caster assembly has a frame, a hub pivotally mounted to the frame and rotatable around a vertical axis, and a front wheel pivotally mounted to the hub configured to support the caster assembly above the support surface;
a mast mounted to and extending above the load bearing member, wherein the mast defines a load axis perpendicular to the load bearing axis;
a support arm extending from the mast toward the front caster assembly, the support arm arranged and configured to suspend a patient load, the patient load defining a lift axis that is perpendicular to the load bearing axis adjacent to the front caster assembly;
a steering handle coupled to the mast, wherein the mast is between at least a portion of the steering handle and the front caster assembly;
a rear support assembly supporting the load bearing member at a second end, the rear support assembly having a rear wheel that is rotatable around a horizontal axis of rotation that is above the load bearing axis;
wherein the front wheel defines a wheel upper extent and the load bearing axis is below the wheel upper extent;
wherein the wheel upper extent is at or below the height of the front caster assembly defined by the frame;
wherein the load bearing member height as it laterally approaches the caster assembly is less than the height of the wheel; and wherein the load bearing member extends laterally from the front caster assembly.

2. The rolling support assembly of claim 1, the front wheel further comprising a height defined by an upper extent, wherein the load bearing axis is below the upper extent of the front wheel.

3. The rolling support assembly of claim 1, wherein the height of the load bearing member as it laterally approaches the front caster assembly is less than or approximately equal to the height of the front caster assembly.

4. The rolling support assembly of claim 1, wherein the hub includes a wheel mount extending away from the hub, the front wheel pivotally mounted to the wheel mount, and wherein the wheel mount is above the lower extent of the load bearing member.

5. The rolling support assembly of claim 1, wherein the hub includes a wheel mount extending away from the hub, and wherein the front wheel is pivotally mounted to the wheel mount, and wherein the wheel mount is between the upper and lower extents of the load bearing member.

6. The rolling support assembly of claim 1, wherein the load bearing member extends laterally away from an outer surface of the frame.

7. A rolling support assembly for supporting an article comprising:
- a load bearing member configured to support a load above a support surface, wherein the load bearing member has an upper extent defining a load bearing member height above the support surface, a lower extent, and a load bearing axis centered between the upper and lower extents;
- a front caster assembly supporting a first end of the load bearing member, the caster assembly having a height defined by a top and a bottom and further including:
  - a frame defining a central opening within the caster assembly, and an outer surface of the caster assembly, wherein the load bearing member extends laterally away from the outer surface of the frame, and wherein the frame defines an upper extent of the front caster assembly;
  - a ball bearing assembly coupled to the frame;
  - a hub positioned within the central opening of the caster assembly, coupled to the ball bearing assembly, and rotatable about a vertical axis of rotation;
  - a front wheel pivotally mounted to the hub and rotatable about a first horizontal axis of rotation, the horizontal axis of rotation positioned between the upper and lower extents of the load bearing member, wherein the wheel has an upper extent defining a height of the wheel that does not project beyond the upper extent of the front caster assembly, and wherein the height of the hub is less than or equal to the height of the load bearing member;
- a mast mounted to the load bearing member;
- a support arm extending from the mast toward the front caster assembly, wherein the support arm is arranged and configured to suspend a load above the load bearing member, the load defining a load axis that is perpendicular to the load bearing axis.

8. The rolling support assembly of claim 7, wherein the height of the load bearing member is less than the height of the front wheel at the point the load bearing member extends away from the frame.

9. The rolling support assembly of claim 7, wherein the height of the load bearing member is less than or approximately equal to the height of the front caster assembly at the point the load bearing member extends away from the front caster assembly.

10. The rolling support assembly of claim 7, wherein the hub includes a wheel mount, the wheel pivotally mounted in a wheel opening defined by opposing sides of the wheel mount, wherein the wheel mount is positioned within the hub between the upper and lower extents of the load bearing member.

11. The rolling support assembly of claim 7, wherein the hub includes a wheel mount extending away from the hub and defining a wheel opening, the front wheel pivotally mounted to an axle coupled to the wheel mount, wherein the front wheel is positioned on the axle within the wheel opening, and wherein the load bearing axis crosses the wheel mount.

* * * * *